US011992861B2

(12) United States Patent
Nalbilwar

(10) Patent No.: US 11,992,861 B2
(45) Date of Patent: May 28, 2024

(54) SCREENING ASSEMBLY FOR A MOBILE BULK MATERIAL PROCESSING APPARATUS

(71) Applicants: SANDVIK LTD, Dungannon Tyrone (GB); SANDVIK MINING AND ROCK TECHNOLOGY INDIA PVT LLTD, Pune (IN)

(72) Inventor: Prasad Nalbilwar, Pune (IN)

(73) Assignees: SANDVIK LTD, Dungannon (GB); SANDVIK MINING AND ROCK TECHNOLOGY INDIA PVT LLTD, Pune (ID)

(*) Notice: Subject to any disclaimer, the term of this patent is extended or adjusted under 35 U.S.C. 154(b) by 0 days.

(21) Appl. No.: 17/919,780

(22) PCT Filed: Apr. 20, 2020

(86) PCT No.: PCT/EP2020/060945
§ 371 (c)(1),
(2) Date: Oct. 19, 2022

(87) PCT Pub. No.: WO2021/213605
PCT Pub. Date: Oct. 28, 2021

(65) Prior Publication Data
US 2023/0166295 A1    Jun. 1, 2023

(51) Int. Cl.
*B07B 1/00* (2006.01)
*B07B 1/10* (2006.01)
(Continued)

(52) U.S. Cl.
CPC ............... *B07B 1/005* (2013.01); *B07B 1/10* (2013.01); *B07B 1/34* (2013.01); *B07B 1/42* (2013.01)

(58) Field of Classification Search
CPC .. B07B 1/005; B07B 1/10; B07B 1/34; B07B 1/42; B07B 1/46; Y02W 30/58; B02C 21/02
(Continued)

(56) References Cited

U.S. PATENT DOCUMENTS 6,186,338 B1 * 2/2001 Douglas ................ B02C 21/02
209/244
6,698,594 B2 * 3/2004 Cohen ..................... B07B 1/005
209/421
(Continued)

FOREIGN PATENT DOCUMENTS

EP    2359944 A2 *  8/2011  ............ B07B 1/005
EP    2359944 A2     8/2011
(Continued)

*Primary Examiner* — Gene O Crawford
*Assistant Examiner* — Muhammad Awais
(74) *Attorney, Agent, or Firm* — Corinne R. Gorski

(57) ABSTRACT

A screening assembly for a mobile bulk material processing apparatus is capable of adjustment of its position with respect to the base frame of the mobile bulk material processing apparatus in order to facilitate the transfer of material from the screen on to the processing unit, such as a crusher, by optimizing the height and the angle of operation of the screening assembly. The screening assembly is also capable of being folded into a compact arrangement, which is compliant to transport regulations, while also being convenient and safe for the operators. The screening assembly includes a base frame and at least two linking elements coupled at pivotable joints in such a way that when in operational position, the two linking elements are configured to adjust the height and the angle of inclination of the screen box to facilitate transfer of material from the screen to the crusher.

15 Claims, 5 Drawing Sheets

(51) Int. Cl.
*B07B 1/34* (2006.01)
*B07B 1/42* (2006.01)

(58) Field of Classification Search
USPC .................................................. 209/26, 421
See application file for complete search history.

(56) References Cited

U.S. PATENT DOCUMENTS

| | | | | |
|---|---|---|---|---|
| 6,705,449 B2* | 3/2004 | Wagstaffe | ............... | B02C 21/02 |
| | | | | 209/241 |
| 6,988,624 B2* | 1/2006 | MacNaughton | .......... | B07B 1/46 |
| | | | | 209/325 |
| 9,427,745 B2* | 8/2016 | Dunn | ...................... | B02C 23/08 |
| 9,611,099 B2* | 4/2017 | Watters | ................... | B02C 21/02 |
| 9,895,696 B2* | 2/2018 | Hamilton | ............... | B02C 1/025 |
| 2006/0186239 A1* | 8/2006 | Koontz | .................... | B60P 3/00 |
| | | | | 241/285.1 |
| 2008/0041984 A1* | 2/2008 | Sauser | .................... | B02C 23/14 |
| | | | | 241/101.76 |
| 2009/0173671 A1* | 7/2009 | O'Keeffe | ................. | B07B 1/46 |
| | | | | 209/421 |
| 2011/0192769 A1* | 8/2011 | Garland | ................. | B07B 1/005 |
| | | | | 209/257 |
| 2013/0037454 A1* | 2/2013 | Schirm | ................... | B07B 13/16 |
| | | | | 209/404 |
| 2013/0126648 A1* | 5/2013 | Robinson | ............... | B02C 23/04 |
| | | | | 241/81 |
| 2013/0168208 A1* | 7/2013 | Erkkila | ................... | B07B 1/005 |
| | | | | 198/618 |
| 2016/0279644 A1* | 9/2016 | Stemper | .................. | B02C 23/08 |
| 2019/0160492 A1* | 5/2019 | Kruse | .................... | B07B 13/18 |

FOREIGN PATENT DOCUMENTS

| | | | | |
|---|---|---|---|---|
| GB | 2351247 A | * | 12/2000 | ............ B07B 1/005 |
| KR | 20120000789 A | * | 1/2012 | |
| WO | WO-2019197706 A1 | * | 10/2019 | ............ B07B 1/005 |
| WO | WO-2019215387 A1 | * | 11/2019 | ............ B02C 21/02 |

* cited by examiner

SCREENING ASSEMBLY FOR A MOBILE BULK MATERIAL PROCESSING APPARATUS

RELATED APPLICATION DATA

This application is a § 371 National Stage Application of PCT International Application No. PCT/EP2020/060945 filed Apr. 20, 2020.

TECHNICAL FIELD

The present disclosure relates to a mobile bulk material processing apparatus and in particular, although not exclusively, to a screening assembly which is removably attached to a mobile bulk material processing apparatus. More specifically, the present disclosure relates to a screening assembly which is capable of adjusting its position, especially the height and the inclination with respect to the base frame of the mobile bulk material processing apparatus.

BACKGROUND ART

Mobile bulk material processing apparatus has been developed for a wide variety of applications including the processing of stone, minerals, construction materials and both domestic and industrial waste to generate smaller and/or size-categorised aggregate for subsequent processing, use or disposal. For example, in both a quarry or a clearance site environment, a mobile crusher is used to crush stone, rubble or site clearance material into smaller pieces. Many of these apparatuses use screening machines to sort the aggregates by their size. Sorting may be achieved by vibration of the screens which causes the undersized particles to pass though the openings on the screen surface while the oversized particles are retained above the screen surface. During operation, the screening machines are sometimes required to be inclined and/or elevated in order to facilitate the transfer of material from the screen surface to the material processing unit, like a crusher. This adjustment of angle of operation of the screen has been achieved by several techniques in the past. In some equipments, fixed inclined screens were constructed in such a way that the screen surfaces were sloped, usually at the discharge end, to aid material movement to the material crushing unit by sliding off the edge of the screen. Further, it is required to keep the screen in horizontal or near horizontal orientation during transport to comply with transport regulations, especially the regulations limiting the height of the vehicle on the road. The horizontal orientation is favoured during maintenance operations as well, since it is easier for the operator to replace the screening media when the screen is horizontal. In order to achieve various slope positions (including horizontal position) of the screen for operation, screen lifting mechanisms have been developed. Patent documents US20130037454A1 and US20190160492A1 disclose mechanisms for using the screen at variable operating angles. However, none of the prior art documents reveal a mechanism for changing both height and inclination of the screening assembly. Moreover, most of the position adjustment mechanisms make use of a single pivotable joint to change the position of the screen. If such mechanisms are to be used for changing the height of the screen as well, it would be required to increase the length of the base frame of the apparatus, which would cause problems in transportation, and also increase the cost and weight of the apparatus.

Accordingly, there exists a need for a screening assembly which is compact, simple in design and convenient for use, and is capable of adjusting both the height and the angle of inclination for facilitation of material transfer from the screen into the material processing unit.

SUMMARY

Some of the objects of the present disclosure, which at least one embodiment herein satisfies, are as follows:

It is an object of the present disclosure to ameliorate one or more drawbacks of the prior art or to at least provide a useful alternative.

More specifically, it is an object of the present disclosure to provide a position adjustment mechanism for the screening assembly for a mobile bulk material processing unit to achieve an optimum height and angle of inclination to facilitate feeding of the material to a processing unit like a crusher.

Another object of the present disclosure is to provide a position adjustment mechanism for a screening assembly to allow it to be lowered to a substantially horizontal orientation at the time of transportation in order to comply with the transport regulations limiting the height of the vehicle on the road.

Yet another object of the present disclosure is to provide a simple to construct and easy-to-use and install mechanism for adjusting the position of the screening assembly with respect to the base frame or chassis of the apparatus.

Still another object of the present disclosure is to provide a compact screening assembly which is capable of folding and unfolding without having to increase the length of the base frame.

A further object of the present disclosure is to provide a screening assembly with improved safety standards both during transport and operation.

Other objects and advantages of the present disclosure will be more apparent from the following description, which is not intended to limit the scope of the present disclosure.

The above objects are achieved by the present disclosure as it provides a screening assembly capable of adjustment of its position with respect to the base frame of the mobile bulk material processing apparatus in order to facilitate the transfer of material from the screen on to the material processing unit, like crusher, by optimizing the height and the angle of operation of the screening assembly. The screening assembly hereby disclosed is also capable of being folded into a compact arrangement which is compliant to transport regulations limiting the height of the vehicle, while also being convenient and safe for the operators.

According to a first aspect of the present disclosure there is provided a mobile screening assembly supporting a screen box for a mobile bulk material processing equipment, such an assembly having a base frame, and at least two linking elements coupled at pivotable joints in such a way that when in unfolded position, which is the operational mode, the two linking elements are configured to be able to change the height and the angle of inclination of the screen box to facilitate transfer of material from the screen box to the material processing unit. More particularly, there is provided a mobile screening assembly for a mobile bulk material processing apparatus, said assembly comprising a base frame having a forward end, a rear end, a lower surface and an upper surface; a first linking element having a forward end and a rear end, said first linking element being movably connected to the base frame via a first attachment means arranged with the base frame allowing a first tilt angle to be set between the base frame and the first linking element, wherein a second linking element is movably arranged with the first linking element via a second attachment means arranged with the first linking element, allowing a second tilt angle to be set between an upper surface of said first linking element and a lower surface of said second linking element.

Advantageously, the mobile screening assembly, when unfolded or in operational mode, allows easy adjustment of position of the screen with respect to the base frame to facilitate material transfer from the screen into the crusher or any other material processing unit placed on the base frame. The adjustment of the position may be with regard to the height of the screen or the angle of inclination or both as per the requirement of the operation.

Preferably, the screen box is supported on the upper surface of the second linking element causing the screen box to move according to the movement of the second linking element in such a way that the position of the screen with respect to the base frame changes according to the change in position of the second linking element. The second linking element may be in the form of a frame comprising of a pair of parallel elongate members, with a pair of cross-bars connecting the two elongate members. Optionally, there may be provided at least a pair of support structures attached to the upper portion of the second linking element to provide support to the screen box.

Preferably, the first attachment means between the first linking element and the base frame is in the form of a pivot joint. Preferably, the second attachment means between the first linking element and the second linking element is also in the form of a pivot joint. Advantageously, the mobile screening assembly is capable of adjusting both elevation and the angle of inclination owing to the operation of the two pivot joints. The pivot joints further provide ease and flexibility of operation to the operator who can choose to position the screen at a wide range of operating angles and heights as required.

Further, the arrangement is compact (especially when folded) and occupies less space than any screening assembly in the prior-art. This feature is useful when the assembly is to be transported on the road, as it complies with the transport regulations which restrict the height of the vehicle.

Optionally, the mobile screening assembly comprises an actuation means to enable movement of the first and the second linking elements in the vertical direction. The actuating means may either be in the form of hydraulic cylinders or external lifting aids like cranes. Preferably, actuation means comprise a pair of extendible and retractable first hydraulic cylinders attached to the base frame, configured to swing the first linking element away from the base frame while remaining attached at the first attachment means. Preferably, another pair of extendible and retractable hydraulic cylinders, called henceforth as second hydraulic cylinders, are also provided. These cylinders are attached to the first linking element and configured to swing the second linking element away from the first linking element while remaining mechanically coupled with the first linking element at the second attachment means. Advantageously, hydraulic cylinders provide ease of operation which is not provided with the use of external lifting aids like cranes. The use of hydraulic cylinders is also safer than using other lifting means. Further, the set-up time is also reduced with the use of hydraulic cylinders as actuation means.

Preferably, the mobile screening assembly further comprises a vertical rear-support structure positioned at the rear end of the base frame extending upwards from the base frame up to the rear end of the second linking element when the assembly is in operational mode. Advantageously, the vertical rear-support structure holds the screening assembly in a raised or inclined position. This is helpful to take the load off the actuating means (especially hydraulic cylinders) and provide a stronger support to the assembly in fixed inclined positions. The vertical rear-support structure may comprise a pair of elongate members connected with at least one cross-bar. Similarly, the mobile screening assembly may further comprise a vertical forward support structure for taking the load off the actuating means (especially the hydraulic cylinders). The vertical forward support structure may be in the form of a frame with two elongate vertical parallel members connected with at least one cross-bar in the middle. Preferably, the vertical forward support structure is positioned at the forward end of the base frame extending upwards from the base frame to the second linking element when the screening assembly is in operational mode.

Preferably, the mobile screening assembly further comprises of a locking system positioned at the forward end of the first linking element. The advantage of having a locking system is that it immobilizes the screening assembly in an inclined or elevated position. The locking system may comprise of at least a pair of parallel plates at the forward end of the first linking element, each plate having an aperture, and a locking pin passing through the second linking element is such a way that the first linking element and the second linking element are affixed together to immobilize the assembly in an inclined or elevated position.

Preferably, the first linking element has a forward end which is in the shape of a triangle, such that one corner of the triangle is attached to the first pivot joint, and one corner houses the locking system. The third corner of the triangle extends horizontally into the elongate member of the first linking element. Preferably, there is also a triangular aperture cut into the forward end of the first linking element. Such a design, advantageously provides strength to the structure of the first linking element. Further, multiple holes can be created below the locking system, to allow fixing of the assembly at different operating positions.

According to another aspect of the present disclosure, there is provided a mobile bulk material processing apparatus comprising a processing unit like a crusher, a screening assembly including a screen box, which is capable of adjusting its position with respect to the base frame of the apparatus to facilitate transport of material into the processing unit, a feeding chute which is mechanically attached to the screen box, and at least one conveyor for transporting material to or from the processing unit.

Preferably, the mobile bulk material processing apparatus further comprises at least a pair of support structures attached to the lower portion of the base frame. Preferably, it may further comprise of a propelling means like wheels or endless tracks provided at the lower portion of the base frame to enable transportation of the apparatus.

According to yet another aspect of the present disclosure, there is provided a method for adjusting the position of a screen box installed on a mobile bulk material processing apparatus, comprising the steps:

providing a mobile screening assembly capable of adjusting its position with respect to the base frame of the apparatus,
  raising the second linking element using actuation means, preferably a pair of hydraulic cylinders to achieve the required angle of inclination of the screen box,
  raising the first linking element using a pair of hydraulic cylinders to enable the screen box to achieve the height required for flow of material into a processing unit, supporting the screening assembly on the vertical rear support structure and vertical forward support structure, locking the position of the raised first linking element using the locking system for the duration of operation, lowering the first and the second linking elements and folding them over the base frame when the apparatus is not in operation.

The above method makes use of the mobile screening assembly in which the forward end of the first linking element is coupled in a movable connection (preferably a pivotable joint) to the forward end of the base frame and the rear end of the first linking element is coupled in a movable connection (preferably a pivot joint) to the rear end of the second linking element.

Advantageously, this method makes the operation of the screening assembly easy and quick. Further, this method is also safe for the operator as the use of cranes and other external lifting aids is minimal during operation.

The mobile screening assembly described in the present disclosure is suitable to be used with different types of crushers, like cone crusher, vertical shaft impact crushers, horizontal shaft impact crushers or any other type of material processing unit. The screening assembly is adaptable to be used with different sizes of the processing units. Another advantage of the assembly is that once the set-up is standardized, it allows for minimum chute variations, which leads to reduced inventory, and flexibility in production. This assembly is also compact and requires less space for operating in raised and lowered orientations, compared to other similar arrangements. Yet another advantage offered by the present disclosure is the improved safety both during operation (in unfolded position) as well as during transport (in folded position).

BRIEF DESCRIPTION OF DRAWINGS

A specific implementation of the present disclosure will now be described, by way of example only, and with reference to the accompanying drawings in which:

FIG. 4a shows the side view of the assembly in horizontal orientation with the linkages folded, FIG. 4b shows the side view of the assembly in intermediate position with second linking element raised, FIG. 4c shows the side view of the assembly in raised and inclined operating position with both first and second linking elements raised.

DETAILED DESCRIPTION OF PREFERRED EMBODIMENT OF THE INVENTION

Figure 1:
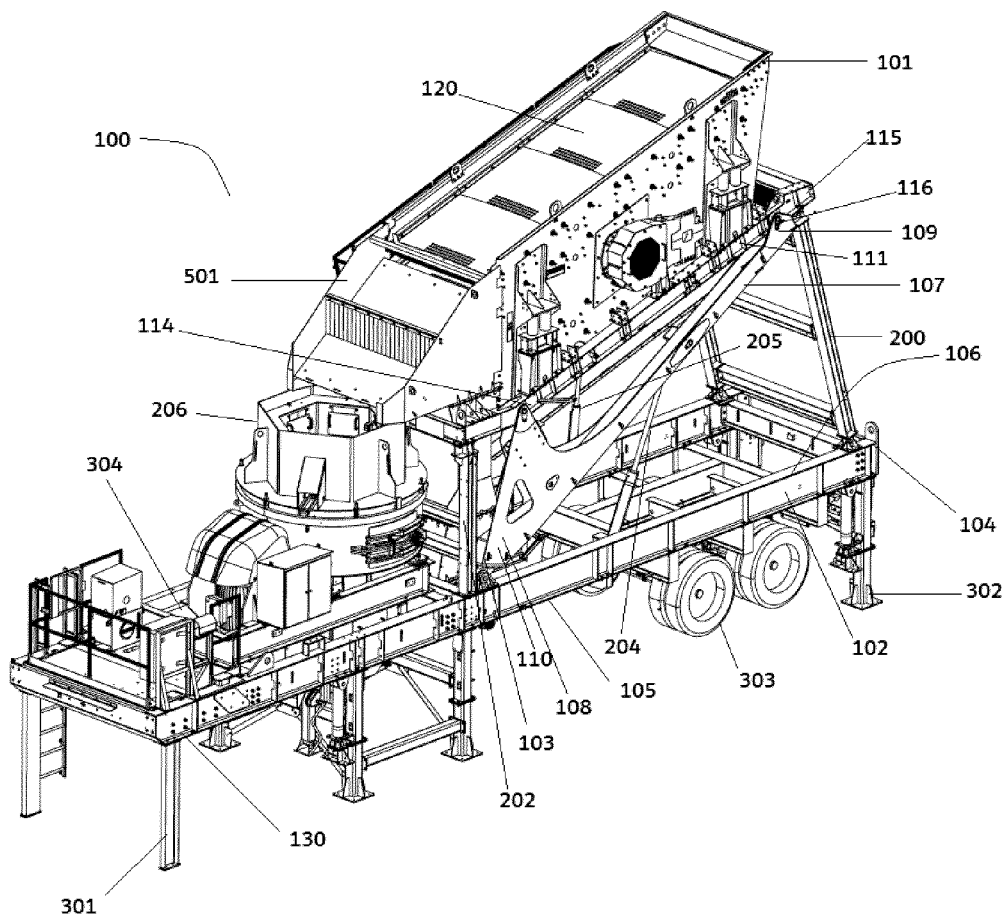
FIG. 1 is a perspective view of the mobile screening assembly according to one of the preferred embodiments of the disclosure.

Embodiments of the present disclosure will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure Referring to FIG. 1, a mobile screening assembly 100 comprises a base frame 102 that provides a central support for the various operative components of the assembly 100. Frame 102 is movably mounted on the front support structure 301 and rear support structure 302, and also has on its lower surface 105, at least one pair of wheels 303 that are driven by suitable power unit (not shown) to propel the assembly 100 over the ground. Frame 102 comprises a pair of parallel and longitudinally extending frame members that extend from a forward end 130 to a rearward end 104. Each frame member is spaced apart in a widthwise direction perpendicular to the main length between ends 130, 104. The assembly 100 is shown to carry a screen box 101 having at least one vibrating screen 120 in such a way that the screen is positioned to facilitate the transfer of material into a feed chute 501 which further feeds the material into a material processing unit 206, which is shown as an example, to be a crusher in this figure. The assembly 100 is configured for adjusting the position of the screen box 101 with respect to the base frame 102 to achieve the optimal position for material transfer into the material processing unit 206. The position adjustment mechanism of assembly 100 includes two pairs of linking elements, (hereinafter referred to as first linking element 107 and second linking element 111) which are attached at two pivot points (hereinafter referred to as first pivot 103 and second pivot 116) to enable vertical and angular movement of the screen box 101 with respect to the base frame 102. The first linking element 107 comprises of a pair of parallel longitudinally extending members having each a forward end 108 and a rearward end 109. The forward end 108 of the first linking element 107 is triangular in shape, and also has a triangular aperture 404 at the center, as may be seen in FIG. 5b.

Figure 4A:
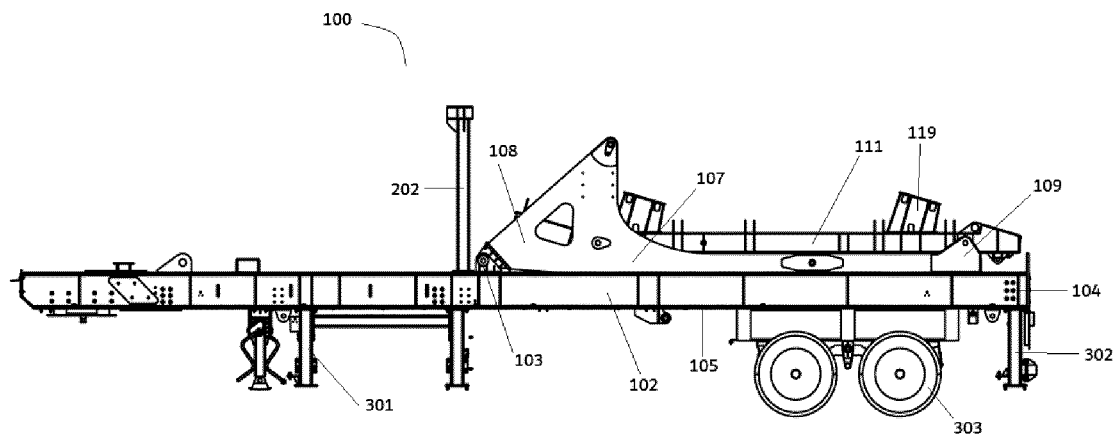
FIG. 4a-4c show the different steps in the operation of the screening assembly according to one of the preferred embodiments of the disclosure.

When in folded position or the transport position as shown in FIG. 4a, the first linking element 107 rests on top of the base frame 102, in such a way that the lower surface of the first linking element 107 is in physical contact with the upper surface 106 of the base frame 102. Attached to the upper surface 106 of the base frame 102, is a pair of first hydraulic cylinders 204 as shown in FIG. 1, which remain retracted when the assembly 100 is in folded position, but when the assembly 100 is in unfolded or the operating position, the hydraulic cylinders 204 extend to move the first linking element 107 away from the base frame 102 in vertical direction, making a first tilt angle ($\alpha$) between the first linking element 107 and the base frame 102. The first linking element 107 is movably attached to the base frame 102 with the help of a pivotable connection, at the first pivot point 103. The element 107 is thus capable of raising at the point 103 and forming a first tilt angle ($\alpha$) with respect to the base frame 102. The assembly 100 when raised can be held at any desired position using the vertical support structure 200 which is detachably mounted at the rearward end 104 of the base frame 102. The structure 200 comprises of a pair of vertical parallel members which are spaced apart widthwise. There is also a pair of parallel horizontal cross beams 207 connecting the two vertical parallel members of the structure 200.

Figure 2:
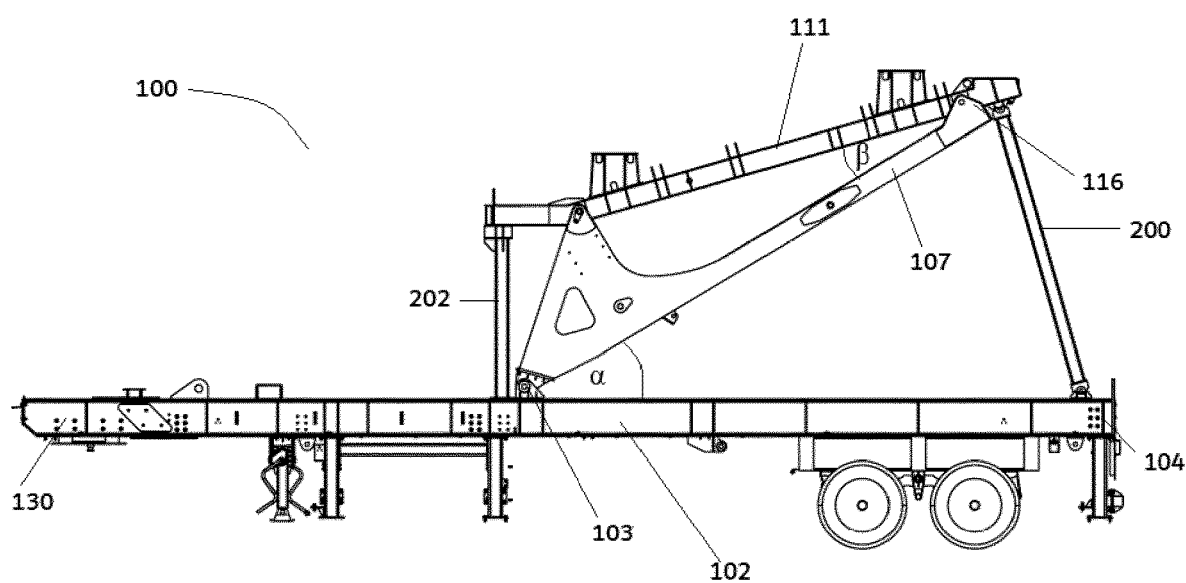
FIG. 2 is a side view of the lifting mechanism of the mobile screening assembly (without the screen) in raised orientation according to one of the preferred embodiments of the disclosure.
Figure 3:
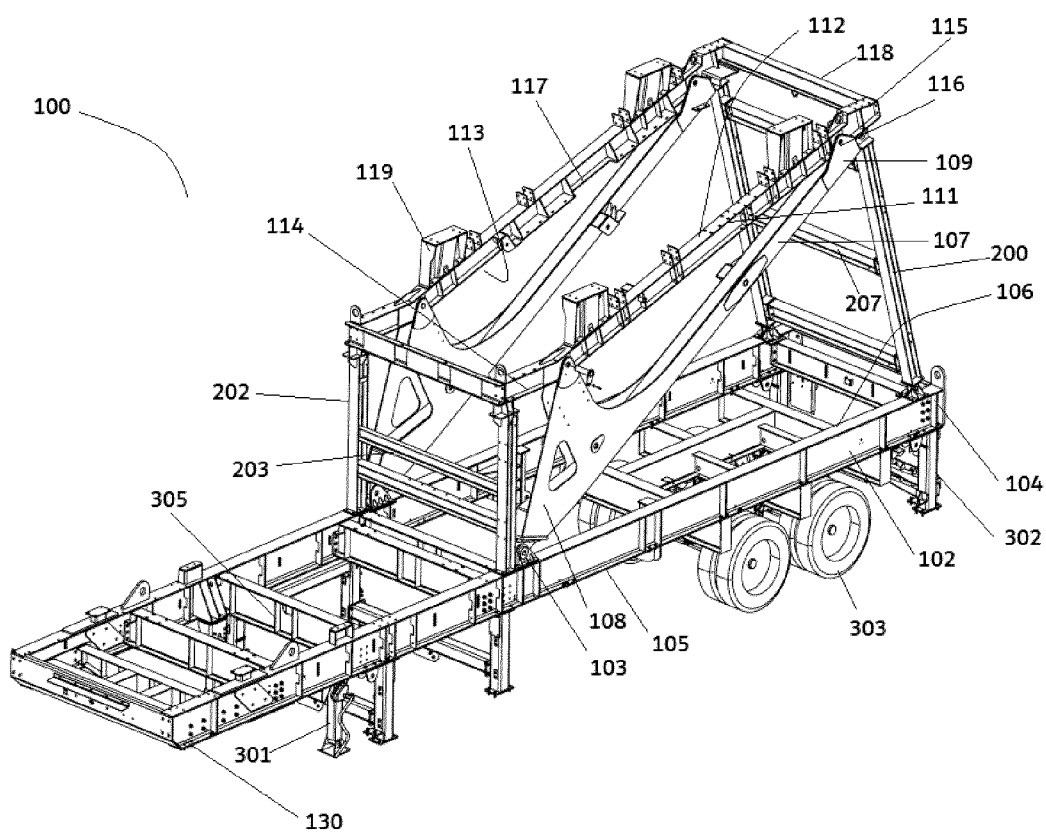
FIG. 3 is a perspective view of the lifting mechanism of the screening assembly (without the screen) in raised orientation according to one of the preferred embodiments of the disclosure.

Referring to FIGS. 2 and 3, the second linking element 111 comprises a forward end 114 and a rearward end 115. The element 111 has a pair of elongate parallel members extending from forward end 114 to rearward end 115, spaced apart widthwise. The element 111 is provided with screen supports 119 at the four corners to hold the screen box 101 at the upper surface 112 of the element 111. There is also provided a pair of horizontal parallel members 118 on both forward 114 and rearward 115 ends of the element 111. The second linking element 111 is provided with a fixed member at the forward end 114, which remains parallel to the base frame 102 at all times. This member provides structural stability to the second linking element 111. It also provides a site on the second linking element 111 for the locking pin to insert and secure the elements 107, 111 together when the assembly 100 is in operational position (as shown in FIG. 5b). At the lower surface 113 of the element 111, there is provided a pair of second hydraulic cylinders 205 which remain in retracted state when the assembly 100 is in folded or transport position. The cylinders 205 expand when the second linking element 111 is required to be raised. The raised second linking element 111 can be supported and held in a fixed position with the aid of front support structure 202.

The front support structure 202 is positioned proximal to the first pivot 103 at the base frame 102 and comprises of a pair of vertical parallel members spaced apart widthwise, along with horizontal cross beams 203 which provide structural stability. The second linking element 111 is movably connected with the first linking element 107 at the pivot point 116, making a second tilting angle ($\beta$) between the upper surface of said first linking element 107 and the lower surface 113 of said second linking element 111. The rearward end 115 of the second linking element 111 is connected with the rearward end 109 of the first linking element 107 at pivot point 116.

Figure 4B:
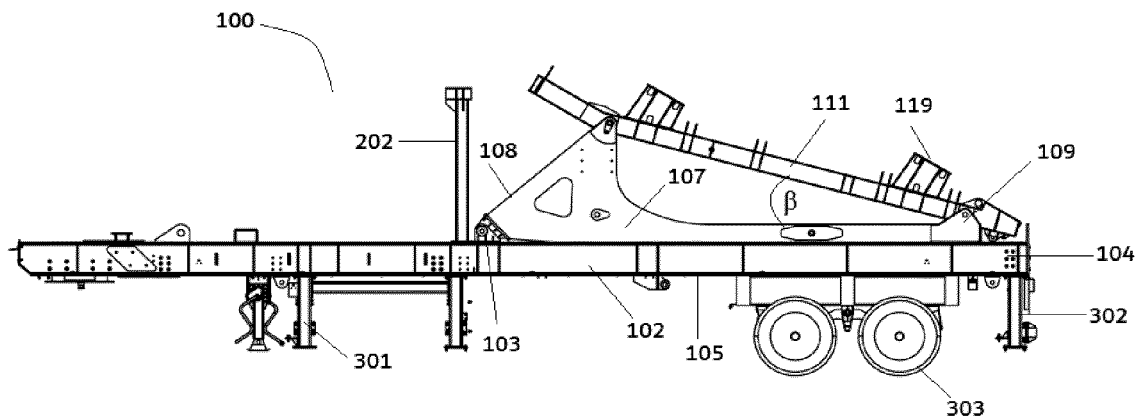
Figure 4C:
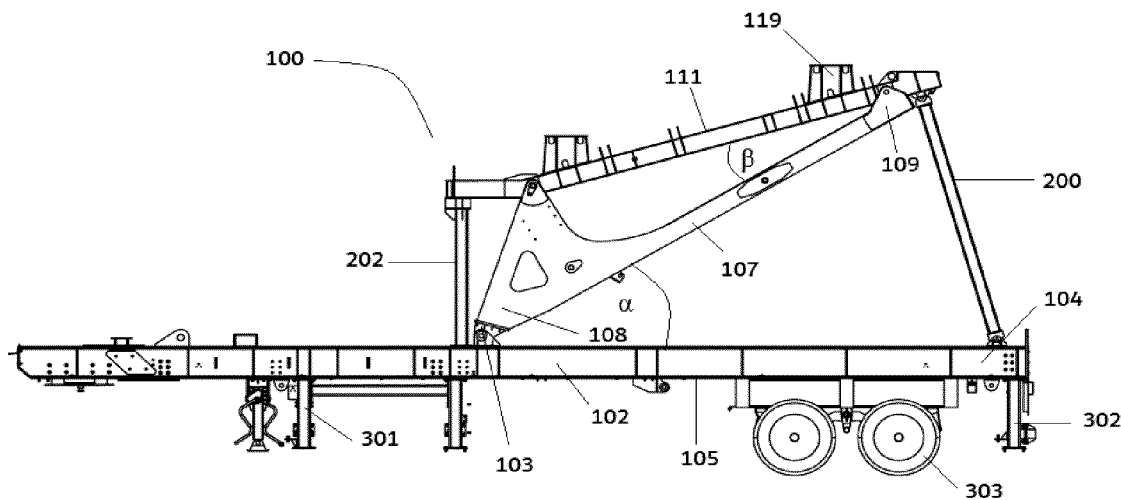

Referring to FIGS. 4a, 4b and 4c, the three stages of operation of the assembly 100 are illustrated. In FIG. 4a, the assembly 100 is in unfolded position or transport position. This position in which the linking elements 107 and 111 of the assembly 100 attain horizontal orientation as is used during transport of the assembly 100 in order to comply with regulations restricting the height of the vehicle on the road. The assembly 100 becomes compact in this folded position and thereby convenient for being transported from one work site to another. As shown in the FIG. 4a, in this position, both the first linking element 107 and the second linking element 111 are folded, in such a manner that the lower surface of the first linking element 107 is in physical contact with the upper surface 106 of the base frame 102. Further, the second linking element 111 is also completely horizontal in orientation to ensure compactness of the assembly 100. At this stage, the vertical support structure 200 is not employed, and remains unmounted for being transported separately.

In FIG. 4b, the intermediate position of the assembly 100 is illustrated. The first linking element 107 remains horizontal and rested on the upper surface 106 of the base frame 102. The second linking element 111 is raised at the desired operating angle by movement of the pivot point 116, causing the element 111 to raise vertically away from the base frame 102 creating a second tilting angle ($\beta$) between the first linking element 107 and the second linking element 111. Hydraulic cylinders 205 as shown in FIG. 1 provide the required thrust to the element 111 for rising.

In FIG. 4c, the operating position or the unfolded position of the assembly 100 is shown. The first linking element 107 is raised with the help of first hydraulic cylinders 204 (not shown), a first tilting angle ($\alpha$) is created between the base frame 102 and the first linking element 107 at the pivot point 103 thereby cause the element 107 to be lifted away from the base frame 102 in the vertical direction. The result of this movement is that the screen box 101 (as shown in FIG. 1) supported at the upper surface 112 of the second linking element 111 is elevated as well as tilted at the desired operating angle to enable transfer of material from the screen 120 through the feed chute 501 into the material processing unit 206. Thus, the assembly 100 is configured to adjust the position of the screen box 101 as required for operation, by changing the elevation as well as the inclination of the second linking element 111. Once the assembly 100 is in the elevated and inclined position (operating position as shown in FIG. 4c), the vertical support structure 200 can be mounted at the rearward end 104 of the base frame 102 to take the load off the hydraulic cylinders 204, 205 (as shown in FIG. 1) and provide the necessary support for holding the assembly in the operating position. Similarly, the rearward end 115 of the second linking element 111 is supported by the front support structure 202 which helps in taking the load off the hydraulic cylinders 204, 205 (as shown in FIG. 1). At the operating position, the assembly 100 can also be locked using locking system 400 to restrict further motion of the assembly 100. After the operation is concluded, the assembly 100 can be folded back to the transport position as shown in FIG. 4a by removing the vertical support structure 200 and retracting the hydraulic cylinders 204, 205 (not shown).

Figure 5A:
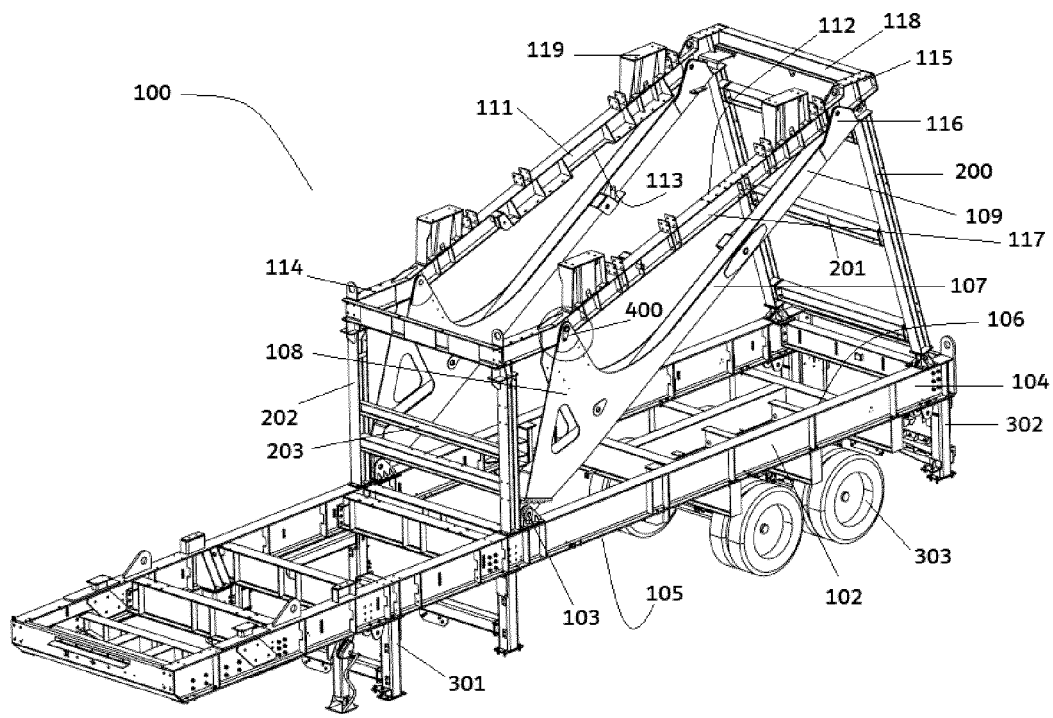
FIG. 5a is a perspective view of the screening assembly with the locking system highlighted.
Figure 5B:
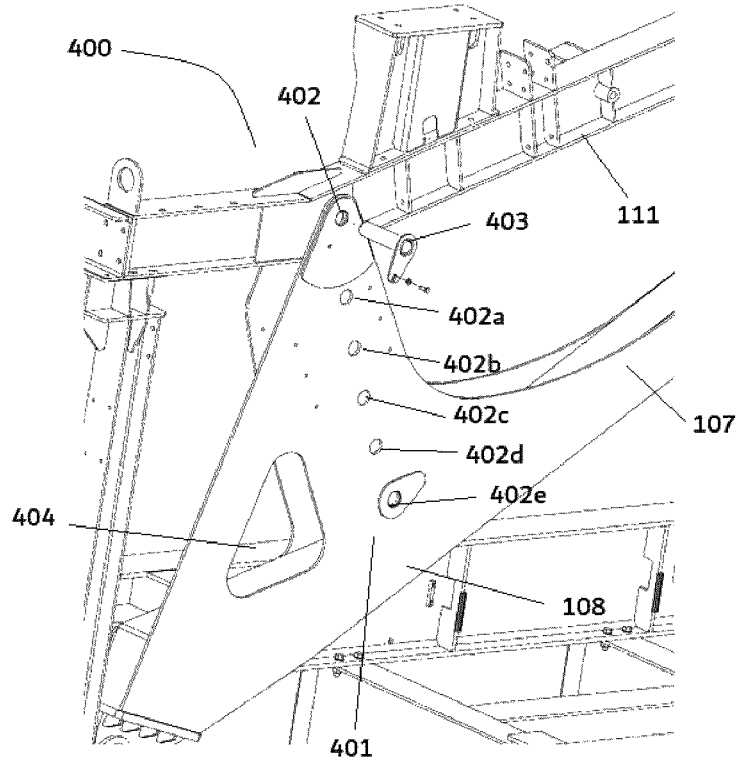
FIG. 5b is a zoomed-in view of the locking system according to one of the preferred embodiments of the disclosure.

Referring to FIGS. 5a and 5b, the locking system 400 is illustrated. As shown in FIG. 5a, the locking system is positioned proximal to the forward ends of both the first linking element 107 and the second linking element 111. A zoomed view of the locking system 400 is provided in the FIG. 5b. The locking system 400 comprises of a pin 403 which can be inserted into the aperture 402 provided at parallel plates 401 of the first linking element 107 in such a way that the pin 403 passes through the second linking element 111 to mechanically connect both the first 107 and the second 111 linking elements. The pin 403 can be removably inserted into the aperture 402 to secure the lock. Depending on the requirement of inclination, the pin 403 may be inserted into any one of the apertures 402a, 402b, 402c, 402d and 402e present on the plate 401 at the forward end 108 of the first linking element 107 to secure the lock and fix the assembly 100 at a chosen inclination. The pin 403 remains detached when the assembly is in folded/transport or intermediate positions.

The following steps provide a method for adjusting the position of a screen box 101 installed on a mobile bulk material processing apparatus to facilitate the transfer of material from the screen to the material processing unit 206.
   a) providing a screening assembly 100 as described above
   b) raising the second linking element 111 to a predefined angle ($\beta$) using a pair of second hydraulic cylinders 205,
   c) raising the first linking element 107 to a predefined angle ($\alpha$) using a pair of first hydraulic cylinders 204 to enable the screen box 101 to achieve the height required for flow of material into a processing unit 206,
   d) supporting the screening assembly 100 on the vertical rear support structure 200 and vertical forward support structure 202,
   e) locking the position of the raised first linking element 107 using the locking system 400 for the duration of operation and f) lowering the first linking element 107 and the second linking element 111 and folding them over the base frame 102 when the apparatus 100 is in transport mode.

The foregoing description of the embodiments has been provided for purposes of illustration and not intended to limit the scope of the present disclosure.

The invention claimed is:

1. A mobile screening assembly supporting a screen box for a mobile bulk material processing equipment, said assembly comprising:
   a base frame having a forward end, a rear end, a lower surface and an upper surface;
   a first linking element having a first element forward end and a first element rearward end, the first linking element being movably connected to the base frame via a first attachment means arranged with the base frame, allowing a first tilt angle to be set between the base frame and the first linking element; and
   a second linking element having a second element forward end and a second element rearward end, the second linking element being movably arranged with the first linking element via a second attachment means arranged with the first linking element, allowing a second tilt angle to be set between an upper surface of the first linking element and a lower surface of the second linking element for effecting elevation of the second element forward end.

2. The mobile screening assembly as claimed in claim 1, wherein the second linking element includes at least a pair of screen support structures affixed to its upper surface.

3. The mobile screening assembly as claimed in claim 1, wherein the second linking element is configured to carry the screen box on its upper surface.

4. The mobile screening assembly as claimed in claim 1, wherein the first attachment means between the first linking element and the base frame is a pivot joint.

5. The mobile screening assembly as claimed in claim 1, wherein the second attachment means between the first linking element and the second linking element is a pivot joint.

6. The mobile screening assembly as claimed in claim 1, wherein the second linking element includes a pair of parallel elongate members, respective front and rear ends of which are connected by a pair of horizontal parallel members.

7. The mobile screening assembly as claimed in claim 1, further comprising a vertical rear-support structure positioned at the rear end of the base frame, the rear-support structure extending upwards from the base frame up to the second element rearward end when the assembly is in an operational mode.

8. The mobile screening assembly as claimed in claim 1, further comprising a vertical forward-support structure positioned at the base frame proximal to the first attachment means extending upwards from the base frame to the second linking element when the assembly is in an operational mode.

9. The mobile screening assembly as claimed in claim 1, further comprising an actuation means arranged to enable the movement of the first and the second linking elements in the vertical direction between a transport mode and an operational mode.

10. The mobile screening assembly as claimed in claim 9, wherein said actuation means include at least a pair of extendible and retractable first hydraulic cylinders attached to the base frame and configured to swing the first linking element away from the base frame while remaining attached at the first attachment means.

11. The mobile screening assembly as claimed in claim 10, wherein said actuation means include at least a pair of extendible and retractable second hydraulic cylinders attached to the first linking element and configured to swing the second linking element away from the first linking element while remaining mechanically coupled with the first linking element at the second attachment means.

12. The mobile screening assembly as claimed in claim 1, further comprising a locking system arranged to fix the assembly when it is in operational mode.

13. The mobile screening assembly as claimed in claim 12, wherein said locking system includes at least a pair of parallel plates of the first linking element, each plate having an aperture-and a locking pin passing through the second linking element is such a way that the first linking element and the second linking element are affixed together by the locking pin.

14. A mobile bulk material processing unit comprising:
   a screening assembly as claimed in claim 1;
   a processing unit;
   a feeding chute mechanically attached to one end of the screen box; and
   at least one conveyor arranged for transporting material to or from the processing unit.

15. A method for adjusting the position of a screen box installed on a mobile bulk material processing unit, the method comprising the steps of:
   providing a mobile screening assembly as claimed in claim 1;
   raising the second linking element to a predefined angle ($\beta$) using a pair of second hydraulic cylinders;
   raising the first linking element to a predefined angle ($\alpha$) using a pair of first hydraulic cylinders to enable the screen box to achieve a height required for flow of material into a processing unit;
   locking a position of the raised first linking element using the locking system for a duration of operation; and
   lowering the first and the second linking elements and folding the first and second linking elements over the base frame when the assembly is in a transport mode.

* * * * *